(12) United States Patent
Honorato Ruiz et al.

(10) Patent No.: US 11,225,015 B2
(45) Date of Patent: Jan. 18, 2022

(54) METHOD FOR MANUFACTURING AN AERONAUTICAL STRUCTURE

(71) Applicant: Airbus Operations S.L.U., Getafe (ES)

(72) Inventors: Francisco Javier Honorato Ruiz, Getafe (ES); Enrique Guinaldo Fernández, Getafe (ES); Carlos García Nieto, Getafe (ES); Guillermo Hernáiz López, Getafe (ES); Jesús Javier Vázquez Castro, Getafe (ES); Diego Lastra Gil, Getafe (ES); Iker Vélez De Mendizábal Alonso, Getafe (ES); Alberto Arana Hidalgo, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 265 days.

(21) Appl. No.: 16/246,678

(22) Filed: Jan. 14, 2019

(65) Prior Publication Data
US 2019/0217536 A1    Jul. 18, 2019

(30) Foreign Application Priority Data

Jan. 17, 2018    (EP) ..................................... 18382017

(51) Int. Cl.
*B29C 64/165*    (2017.01)
*B29C 64/118*    (2017.01)
(Continued)

(52) U.S. Cl.
CPC .......... *B29C 64/165* (2017.08); *B29C 64/118* (2017.08); *B29C 70/081* (2013.01);
(Continued)

(58) Field of Classification Search
CPC ... B29C 64/165; B29C 70/081; B29C 70/382; B29C 64/118; B29C 70/68; B29C 70/30;
(Continued)

(56) References Cited

U.S. PATENT DOCUMENTS 4,935,277 A * 6/1990 Le Balc'h ............. B64C 27/473
428/71
2006/0073309 A1    4/2006 Hogg
(Continued)

FOREIGN PATENT DOCUMENTS

WO    2015164954 A1    11/2015
WO    2017092764 A1    6/2017

OTHER PUBLICATIONS

European Search Report; priority document.

*Primary Examiner* — Leith S Shafi
(74) *Attorney, Agent, or Firm* — Greer, Burns & Crain, Ltd.

(57) ABSTRACT

A method for manufacturing, layer-upon-layer, an integral composite aeronautical structure, wherein the method comprises: (a) providing an additive manufacturing tool comprising a depositing mold shaping an aerodynamic surface and at least one head configured to be moved over the depositing mold and to deposit fibrous material reinforcement and/or meltable material; (b) depositing fibrous material reinforcement embedded within meltable material onto the depositing mold, at least one layer of a lower aerodynamic face-sheet being built thereby; (c) depositing meltable material onto at least a portion of the outer layer of the lower aerodynamic face-sheet, at least one layer of core structure being built thereby; and (d) depositing fibrous material reinforcement embedded within meltable material onto at least the outer layer of the core structure, at least one layer of an upper aerodynamic face-sheet being built thereby; wherein steps (b), (c) and (d) are performed using Additive Manufacturing technology.

11 Claims, 8 Drawing Sheets

(51) Int. Cl.
*B33Y 10/00* (2015.01)
*B33Y 70/00* (2020.01)
*B33Y 80/00* (2015.01)
*B64C 9/00* (2006.01)
*B29C 70/08* (2006.01)
*B29C 70/38* (2006.01)
*B33Y 30/00* (2015.01)
*B64F 5/10* (2017.01)
*B29K 101/12* (2006.01)
*B29K 105/08* (2006.01)
*B29K 105/12* (2006.01)
*B29L 31/30* (2006.01)
*B64C 1/00* (2006.01)
*B29C 70/68* (2006.01)

(52) U.S. Cl.
CPC ............ *B29C 70/382* (2013.01); *B33Y 10/00* (2014.12); *B33Y 30/00* (2014.12); *B33Y 70/00* (2014.12); *B33Y 80/00* (2014.12); *B64C 9/00* (2013.01); *B64F 5/10* (2017.01); *B29C 70/68* (2013.01); *B29K 2101/12* (2013.01); *B29K 2105/08* (2013.01); *B29K 2105/12* (2013.01); *B29K 2995/0063* (2013.01); *B29L 2031/3076* (2013.01); *B29L 2031/3085* (2013.01); *B64C 2001/0072* (2013.01)

(58) Field of Classification Search
CPC ... B29C 70/54; B64C 9/00; B64C 2001/0072; B33Y 30/00; B33Y 10/00; B33Y 70/00; B33Y 80/00; B64F 5/10; B29L 2031/3085; B29L 2031/3076; B29K 2995/0063; B29K 2101/12; B29K 2105/08; B29K 2105/12; Y02T 50/40
See application file for complete search history.

(56) References Cited

U.S. PATENT DOCUMENTS

| | | | |
|---|---|---|---|
| 2014/0361460 A1* | 12/2014 | Mark | B29C 70/16 264/248 |
| 2017/0021565 A1 | 1/2017 | Deaville | |
| 2017/0225767 A1* | 8/2017 | King | B29C 35/045 |
| 2017/0232674 A1* | 8/2017 | Mark | B33Y 30/00 264/308 |
| 2017/0252966 A1* | 9/2017 | Susnjara | B29C 48/18 |
| 2018/0347541 A1* | 12/2018 | Kudsk | B33Y 10/00 |
| 2019/0032491 A1* | 1/2019 | Nissen | F01D 5/005 |
| 2019/0153994 A1* | 5/2019 | Tobin | B29C 64/10 |
| 2019/0153995 A1* | 5/2019 | Tobin | F03D 1/0675 |
| 2019/0217510 A1* | 7/2019 | McGinnis | B29C 33/505 |
| 2019/0293049 A1* | 9/2019 | Roberts | F03D 1/0641 |

* cited by examiner

METHOD FOR MANUFACTURING AN AERONAUTICAL STRUCTURE

CROSS-REFERENCES TO RELATED APPLICATIONS

This application claims the benefit of the European patent application No. 18382017.4 filed on Jan. 17, 2018, the entire disclosures of which are incorporated herein by way of reference.

FIELD OF THE INVENTION

The present invention belongs to the field of manufacturing, in particular to the field of manufacturing aeronautical structures by using Additive Manufacturing technology. More specifically, the invention is of special application in the manufacturing of movables and control surfaces of the aircrafts.

BACKGROUND OF THE INVENTION

Movables and control surfaces are primary flight control structures through which the attitude of an aircraft is controlled during take-off, flight, and landing. Because of their responsibility in aircraft safety operation, movables and control surfaces are designed using well-known manufacturing techniques which assure reaching the high structural requirements of the certification rules. For instance, failure to properly keep the tolerances, sizing or balance of a control surface could lead to deviation from normal aircraft operation.

Briefly, standard movables and control surfaces design comprises a main spar, a set of ribs, an upper cover and a lower cover.

Historically, aircraft components have been made of aluminum alloys. In the last decades, with the development of composite manufacturing technologies, such structural components have been manufactured with different techniques as, for instance, co-bonding or co-curing of Carbon Fiber Reinforced Plastic (CFRP) constituent parts.

Nevertheless, all these manufacturing technologies require that the components roll over different stages carrying operations in order to manufacture separately different constituent parts, which would be afterwards assembled together. This constitutes a time-demanding process predetermining the production rate of aircrafts. As a consequence, the final component is achieved after a series of different manufacturing steps that increment the cost and time of fabrication.

Therefore, manufacturing in the aerospace industry is a labor-intensive, multi-step process that requires a quick, reliable, and effective fabrication. The combination of a number of steps and the number of final components to manufacture (end-use components) causes delays prompting the key drawback for the aeronautical industry.

SUMMARY OF THE INVENTION

The present invention provides a solution for the aforementioned problems, by a method for manufacturing layer-upon-layer an integral composite aeronautical structure and an aeronautical structure, preferably a control surface.

In a first inventive aspect, the invention provides a method for manufacturing layer-upon-layer an integral composite aeronautical structure, preferably the aeronautical structure being a control surface, wherein the method comprises the steps of:

providing an additive manufacturing tool comprising a depositing mold shaping an aerodynamic surface and at least one head configured to be moved over the depositing mold and to deposit fibrous material reinforcement and/or meltable material;

depositing fibrous material reinforcement embedded within meltable material onto the depositing mold, at least one layer of a lower aerodynamic face-sheet being built thereby;

depositing meltable material onto at least a portion of the outer layer of the lower aerodynamic face-sheet, at least one layer of core structure being built thereby; and depositing fibrous material reinforcement embedded within meltable material onto at least the outer layer of the core structure, at least one layer of an upper aerodynamic face-sheet being built thereby;

wherein the steps b), c) and d) are performed using Additive Manufacturing technology.

Throughout this entire document, "Additive Manufacturing technologies" (AM) will be understood as those technologies that build 3D objects by adding layer-upon-layer of material, where the material (either meltable material or matrix material in the case of reinforced materials) changes to a liquid upon the application of heat and solidifies (or hardens) to a solid when cooled.

Commonly, these technologies use a computer with 3D modelling software (Computer Aided Design or CAD), an additive manufacturing tool (e.g., machine equipment) and layering material. The CAD sketch is a 3D electronic model of the final 3D object built. The AM tool is able to read in data from the CAD file (both the cross-section geometry and surface pattern) and lays down or deposits successive layers of liquid, powder, sheet material or the like, by at least one head in a layer-upon-layer fashion to fabricate a 3D object.

Many technologies are encompassed within Additive Manufacturing technologies, depending on the form of the material and machine technology used. Among others, it may be pointed out the Selective Laser Sintering (SLS), Stereolithography (SLA), Multi-Jet Modelling (MJM), 3D-Printing (3DP) or Fused Filament Fabrication (FFF).

In a preferred embodiment of the method of the invention, steps b), c) and d) are performed using Fused Filament Fabrication (FFF).

The Fused Filament Fabrication (FFF) is a process oriented fabrication which involves the use of materials injected through at least one indexing nozzle onto a depositing mold. The nozzle(s) trace(s) the surface pattern, which may be either flat or curve, for each particular layer with the material hardening prior to the application of the next layer. The process repeats until the build or part is completed. Preferably, these materials are thermoplastic materials or fibrous material reinforcement embedded within thermoplastic material.

Throughout this entire document, in the sequence of deposition, the outer layer should be understood as the last layer deposited in each step performed.

According to the invention, the fibrous material reinforcement may be in the form of fibrils (very short and/or irregular fibers), nanofibers, carbon fillers, short fibers (length <1 mm), or continuous fibers (extended continuously along the whole filament and thus along the whole length/width of the part when manufactured), for example. Additionally, the fibrous material reinforcement may be glass, carbon, polymer fibers or any other conventional material used as reinforcement.

According to the invention, the meltable material may be a thermoplastic material such as PA (Polyamide), PEEK (Polyether ether ketone), PAEK (Polyaryletherketone) or PEKK (Polyetherketoneketone), which can be unreinforced or reinforced with short fibers. In a preferred embodiment, the meltable material is in the form of a filament for better storing and handling.

In a preferred embodiment, the meltable material is a thermoplastic material of any of the following: PEKK, PAEK, or PEEK. More preferably the meltable material is PAEK or PEEK. And more preferably the meltable material is PEEK.

By the synergistic combination of depositing fibrous material reinforcement with meltable material, a lightweight design is achieved because less amount of material is needed to meet the structural requirement compared to using solely meltable material.

In a preferred embodiment, this fibrous material reinforcement is deposited to better suit future load requirements during operation. Therefore, an optimized aeronautical structure with a structural arrangement (more accurate to match main load paths) is achieved. Also, this allows a weight-saving due to the optimization of additional internal reinforcing elements.

In short, the layered aeronautical structure manufactured by the method according to the invention has, among others, the following features:

High-resolution surfaces, normally with a resolution of up to 0.1 mm for meltable material, and up to 0.2 mm for fibrous material reinforcement embedded within meltable material.

There is no interface between the aerodynamic face-sheets and the core structure once the method ends because the meltable material works as a binder joining the core structure and the face-sheets.

This last remarkable feature of no interface has additional advantages, such as the improvement against water ingestion issues and debonding (dislike conventional composite manufacturing technologies which adhesively bond the core to the face-sheets), since the aeronautical structure is completely integrated (the final product is a self-sealed structure). Also, there is an operation enhancing due to the better structural behavior of the final aeronautical structure built.

Regarding the additive manufacturing tool, depending on the fibrous material reinforcement embedding, a different type and number of heads may be used. According to the invention, the additive manufacturing tool may have either one head configured to deposit meltable material and another head configured to deposit fibrous material reinforcement to be embedded within meltable material, or only one head configured to switch the material to be deposited. Furthermore, fibrous material reinforcement may be embedded either:

previously to entering the head (similar to pre-impregnated composites), or in situ in the head, or in situ over the component, depositing the fibrous material reinforcement and the meltable material separately and once deposited, applying heat to melt the meltable material.

Advantageously, the method according to the first inventive aspect allows a simpler tooling, in view of conventional composite manufacturing technologies that needed autoclaves, vacuum bagging, trimming, etc. Therefore, non-recurring cost saving is achieved. Besides, since the buy-to-fly ratio (understood as the ratio between mass of material that is required to produce a part and the mass of material in the finished aeronautical structure) is reduced versus current composite manufacturing technologies, recurring costs are also saved. This is because in the method of the invention there is almost no material waste.

Preferably, in steps b) and d) of the method according to the invention, the head is configured to be moved over the depositing mold in the three-translational axes (X, Y, Z) and/or rotations (around X, Y, Z). As a result, the lower and upper aerodynamic face-sheets are formed by layers not limited to the horizontal plane XY, thus having an external aerodynamic shape. However, in steps c) the head preferably moves just in horizontal directions (X, Y) and therefore the core structure roughly reproduces the outer shape of an aerodynamic surface by a set of substantially flat layers (i.e. as horizontal layers in XY plane) vertically stacked.

In a particular embodiment, between steps c) and d) the method further comprises covering at least one edge of at least one layer of the core structure by depositing fibrous material reinforcement embedded within meltable material onto both at least a portion of the outer layer of the lower aerodynamic face-sheet and the core structure.

As a result of this step, at least one structural element is built, being this structural element a spanwise stiffening element commonly known as spar which is also integrated with the rest of the structure since it is joined by the meltable material to both the face-sheets and the core.

Advantageously, the at least one structural element covering at least one edge of at least one layer of the core structure offsets the staircase effect of the core structure (if more than one layer is deposited). The staircase effect is the result of the approximation of surfaces at an angle by the layer thickness as the height of a step during manufacturing. Therefore, the mechanical properties of the final aeronautical structure are also improved in Z-direction, i.e., substantially perpendicular to the depositing mold.

In a particular embodiment, in the step between steps c) and d) the fibrous material reinforcement comprises continuous fibers. Advantageously, this allows a better load-withstanding of the aeronautical structure due to high strength and stiffness of continuous fibers embedded within a meltable material. The meltable material acts as a connective matrix, allowing the pressure and shear stresses transmission between the fibers.

In addition, as the fibrous material reinforcement comprises continuous fibers, it is possible to be oriented during the building process to better suit future load requirements during operation.

In a preferred embodiment, in the step between steps c) and d) the fibrous material reinforcement is all continuous fibers.

In a particular embodiment, the fibrous material reinforcement deposited in step b) comprises continuous fibers. Advantageously, this improves the load-withstanding of the aeronautical structure and reduces the warp effect, i.e., distortion of the component due to shrinkage of the top layer, therefore maintaining the aerodynamic shape.

In a particular embodiment, the fibrous material reinforcement deposited in step d) comprises continuous fibers.

Similarly, this improves the load-withstanding of the aeronautical structure and keeping of its aerodynamic shape.

In a particular embodiment, step c) comprises depositing fibrous material reinforcement embedded within meltable material. Preferably, the fibrous material reinforcement is short-fiber.

In a particular embodiment, in step c) hollowed spaces free of material are formed during the depositing of either meltable material or fibrous material reinforcement embedded within meltable material. As a result, a non-homogeneous core structure is built. Advantageously, this allows a more accurate structure in view of future load paths during operation. Also, this allows weight-saving. In this embodiment, step c) may be performed either in a start and stop deposition and/or in a non-constant volumetric rate.

In a particular embodiment, the density of the non-homogeneous core structure varies along the span length and/or cord length of the aeronautical structure.

In a particular embodiment, the core structure comprises fractal type geometry or honeycomb geometry. Advantageously, this allows a high-performance core geometry improving the acoustics and impact resistance applications of the aeronautical structure.

In a particular embodiment, the structural element resulting from the additional step between steps c) and d) is a beam-shaped structural element, preferably being a spar.

In a particular embodiment, the beam-shaped structural element is a Z-shaped spar, and:
the deposition onto at least a portion of the outer layer of the lower aerodynamic face-sheet builds a lower foot of the Z-shaped spar, and
the deposition onto the edge of the at least one layer of the core structure builds a web of the Z-shaped spar.

In a particular embodiment, the deposition onto the core structure also builds an upper foot of the Z-shaped spar configured to form a continuous surface with the outer layer of the core structure.

In a particular embodiment, the web of the Z-shaped spar is straight and angled with the upper and lower aerodynamic face-sheets corresponding to the staircase of the core structure.

In a particular embodiment, the joints between the lower foot and the web, and/or the upper foot and the web, of the Z-shaped spar comprise a curvature radius.

In a second inventive aspect, the invention provides an aeronautical structure, preferably a control surface, being manufactured using the method according to any of the embodiments of the first inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

The invention defines a method for manufacturing layer-upon-layer an integral composite aeronautical structure (10). The method comprises the following steps:

a) providing an additive manufacturing tool (20) comprising a depositing mold (23) shaping an aerodynamic surface and at least one head (24) configured to be moved over the depositing mold (23) and to deposit fibrous material reinforcement embedded in meltable material and/or meltable material; providing fibrous material reinforcement and providing a meltable material, preferably a thermoplastic material or resin, more preferably a thermoplastic material;

b) depositing fibrous material reinforcement embedded within meltable material onto the depositing mold (23), at least one layer of a lower aerodynamic face-sheet (11) being built thereby;

c) depositing meltable material onto at least a portion of the outer layer of the lower aerodynamic face-sheet (11), at least one layer of core structure (12) being built thereby; and d) depositing fibrous material reinforcement embedded within meltable material onto at least the outer layer of the core structure (12), at least one layer of an upper aerodynamic face-sheet (14) being built thereby;

wherein the steps b), c) and d) are performed using Additive Manufacturing technology.

Figure 1:
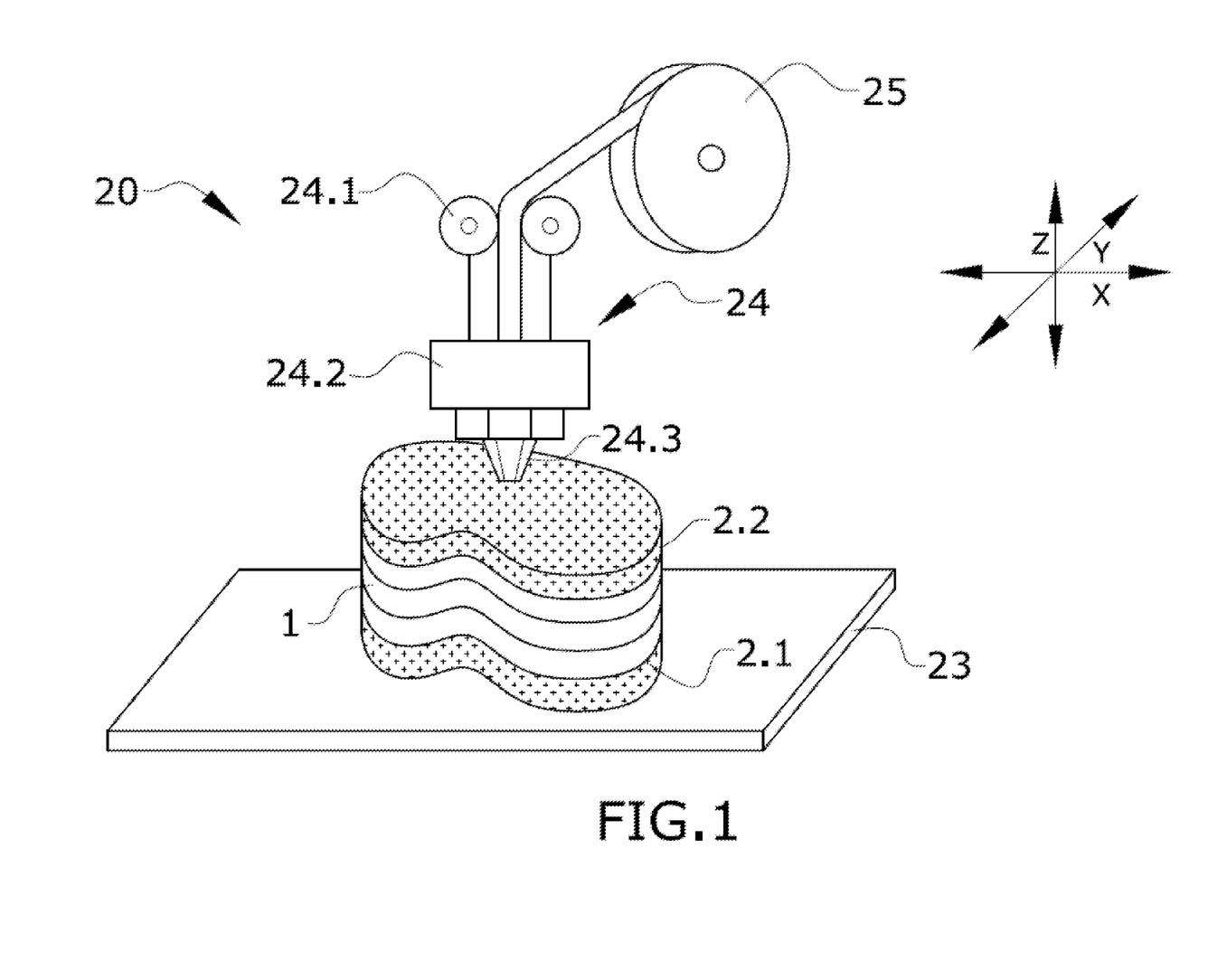
FIG. 1 shows an additive manufacturing tool.

FIG. 1 shows an embodiment of an additive manufacturing tool (20) usable in the method of the invention. The additive manufacturing tool (20) comprises:

a spool (25) storing either meltable material, or fibrous material reinforcement embedded within meltable material, preferably both in a filament form;

a depositing mold (23), shaping the external aerodynamic surface of a lower aerodynamic face-sheet (11) or shell; and at least one head (24) configured to be moved over the depositing mold (23) and to deposit at the same time the material stored in the spool (25) tracing the surface pattern for each particular layer with the material hardening prior to the application of subsequent layer.

In an embodiment, the head (24) is configured to be moved over the depositing mold in the three-translational axes (X, Y, Z) and/or rotations (around X, Y, Z). Optionally, the head (24) may be also configured to be moved over the depositing mold just in horizontal directions (X, Y) while the movement in vertical Z-direction is performed by the depositing mold (23), thus implementing the so-called 2.5D fabrication. The movement of the head (24) and/or of the depositing mold may be achieved by actuators and/or servos, one for each direction and/or rotations.

The material stored in the spool (25) is led to the head (24). The head (24) additionally comprises an extruder (24.1) which uses torque and pinch systems to feed and retract the material fed, in order to drive the required amount of material to be deposited. The head (24) also comprises a heater block (24.2) for heating the meltable material up to a precise temperature. Once the material is heated, it is forced out of a nozzle (24.3) by a reduction in its diameter to deposit the material more accurately.

In an embodiment, the heater block (24.2) is arranged directly in the nozzle (24.3).

Each material to be deposited, even if the meltable material is the same, may need a different temperature to be melted depending on its form or size. In other words, different temperatures may be required to melt fibrous material reinforcement embedded within meltable material or solely meltable material and therefore, more than one head may be used. For illustrative purposes, only one head (24) has been shown.

Optionally, one head (24) may comprise two housings each with a nozzle (24.3), one intended to drive meltable material and the other to drive fibrous material reinforcement embedded within meltable material, or solely fibrous material reinforcement.

Method for manufacturing layer-upon-layer an integral composite aeronautical structure (10)

Figure 2A:
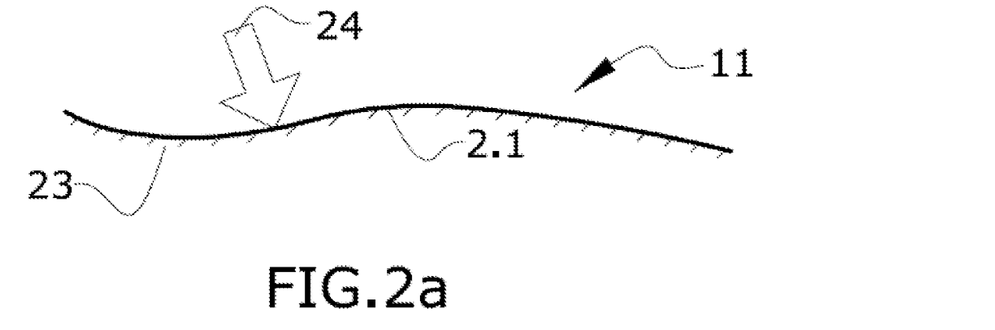
FIGS. 2a-2c show a method for manufacturing, layer-upon-layer, an integral composite aeronautical structure according to the invention.
Figure 2B:
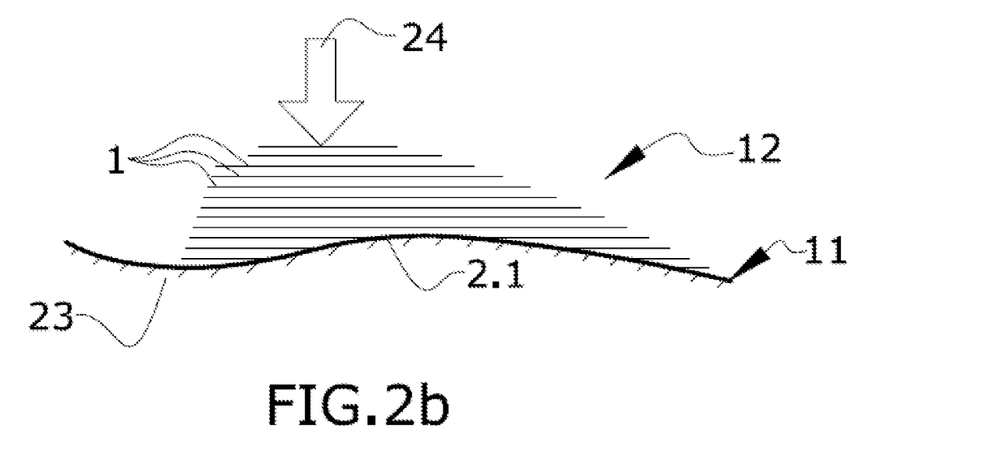
Figure 2C:
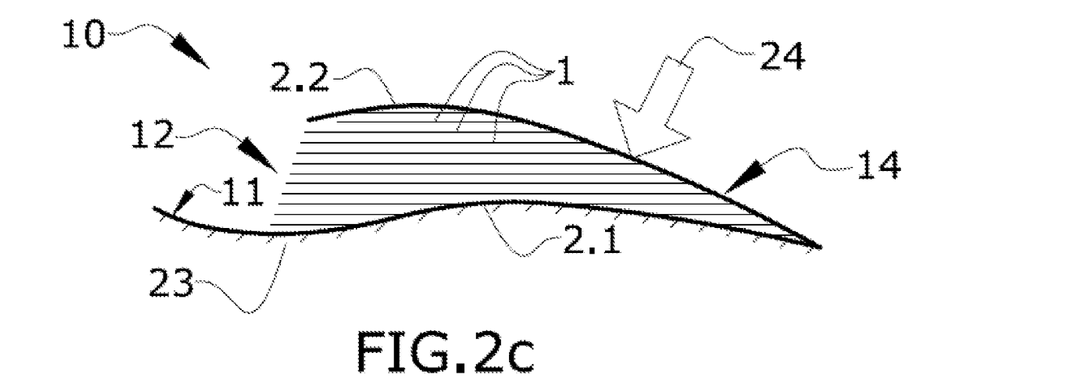

FIGS. 2a-2c schematically show an embodiment of the method for manufacturing, layer-upon-layer, an integral composite aeronautical structure (10) according to the invention.

Once the additive manufacturing tool (20) and the required material have been provided, fibrous material reinforcement embedded within meltable material is deposited or laid up onto the depositing mold (23), preferably as continuous fibers embedded within meltable material in the form of filament. This step is schematically shown in FIG. 2a.

This process is performed as the head (24) moves on the three-translational axes (X, Y, Z) and/or rotations (each around an axis X, Y, Z), following the shape of the aerodynamic surface to be built. The nozzle (24.3) deposits each layer of fibrous material reinforcement embedded within meltable material (2.1) with the material hardening prior to the application of the next layer (2) and this step is repeated until all the required layers (2.1) are deposited and the lower aerodynamic face-sheet (11) is completely built. For illustrative reasons, only one layer of fibrous material reinforcement embedded within meltable material (2.1) is represented in FIGS. 2a-2c.

Throughout FIGS. 2a-2c and 3a-3d an arrow has been drawn representing the location of the head (24) in each step. This is only for illustrative purposes.

Once the lower aerodynamic face-sheet (11) is built, meltable material is deposited onto at least a portion of the outer layer of the lower aerodynamic face-sheet (11), at least one layer of core structure (12) being built thereby. This step, schematically shown in FIG. 2b, is performed as the head (24) moves on the two-translational axes (X, Y), thus performing a 2.5D fabrication. The nozzle (24.3) deposits each layer of meltable material (1) with the material hardening prior to the application of the next layer (1) and the process is repeated until all the required layers (1) are deposited and the core structure (12) is completely built. As the layers (1) are deposited or stacked vertically in step b), in order to approximate the angles, a staircase effect may be created with the layer thickness as the height of a step. As a result, the core structure roughly reproduces the outer shape of an aerodynamic surface by a set of substantially flat layers (i.e., as horizontal layers in X, Y) vertically stacked.

As it will be depicted in more detail in FIGS. 4a-4g, this step may be performed leaving hollowed spaces (12.2) free of material during the deposition. Hence, the core structure (12) built may be non-homogeneous, or may comprise a fractal type geometry and/or a honeycomb geometry.

Once the core structure (12) is built, fibrous material reinforcement embedded within meltable material is deposited onto at least the outer layer of the core structure (12), preferably as continuous fibers embedded within meltable material in the form of filament. This step, schematically shown in FIG. 2c, is performed as described in relation with FIG. 2a, with the head (24) moving on the three-translational axes (X, Y, Z) and/or rotations (around X, Y, Z), depositing a layer of fibrous material reinforcement embedded within meltable material (2.2) over the layers (1) of the core structure (12) for reproducing the shape of an aerodynamic surface of an upper aerodynamic face-sheet (14). For illustrative reasons, only one layer of fibrous material reinforcement embedded within meltable material (2.2) is represented.

The nozzle deposits each layer (2.2) with the material hardening prior to the application of the next layer (2.2) and the step is repeated until all the required layers (2.2) are deposited and the upper aerodynamic face-sheet (14) is completely built.

By performing the described steps, an aeronautical structure (10) is built thereby. The aeronautical structure, preferably a control surface, comprises two main directions: a span wise direction, i.e., from the root to the tip, and a cord wise direction, i.e., from the leading edge to the trailing edge.

Advantageously, since the head (24) deposits the material according to the shape of the constituent parts of the aeronautical structure (10) (not horizontally as it is done in 2.5D fabrication), a staircase effect is avoided in the formation of the lower and the upper aerodynamic face-sheets. Also, there is no need of a final trimming to reach the final dimensions as the aeronautical structure (10) is built near to its net-shape.

Moreover, this process is capable of fabricating end-use aeronautical structures (10), also avoiding the rolling over different fabrication stages. Therefore, this process may be understood as a one-shot fabrication process because the structure built, once taken out from the additive manufacturing tool (20), is final.

Figure 3A:
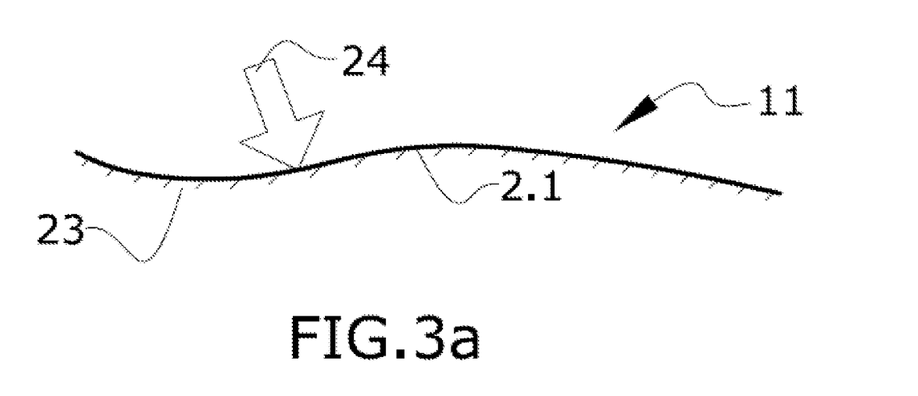
FIGS. 3a-3d show the method of FIGS. 2a-2c for manufacturing, layer-upon-layer, an integral composite aeronautical structure additionally comprising an internal structural element.
Figure 3B:
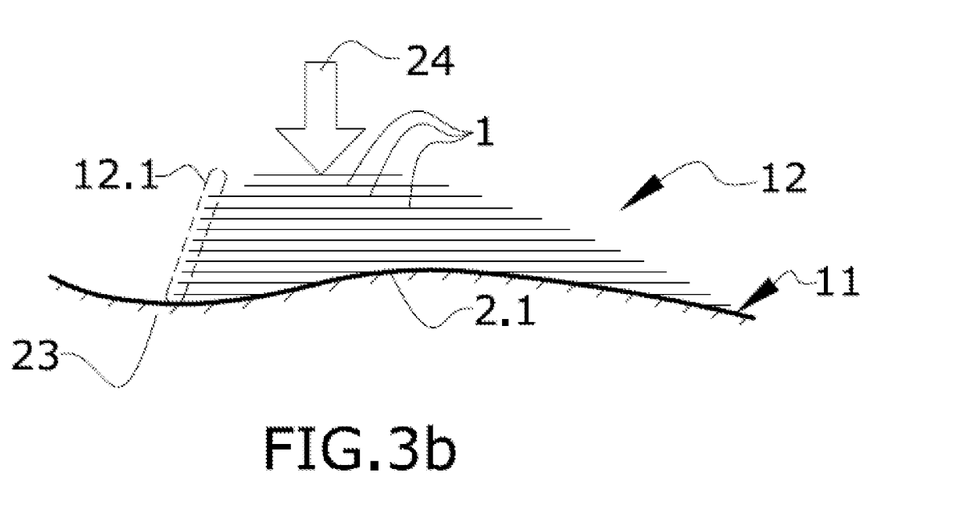

FIGS. 3a-3d shows a method as described in connection with FIGS. 2a-2c in which the aeronautical structure (10) additionally comprises an internal structural element (13). In this embodiment, the steps of building the lower aerodynamic face-sheet (11) and the core structure (12), schematically depicted in FIGS. 3a and 3b, respectively, are the same as described in connection with FIGS. 2a and 2b. An additional step is performed in this embodiment, according to which fibrous material reinforcement embedded within meltable material is deposited onto both at least a portion of the outer layer of the lower aerodynamic face-sheet (11) and the core structure (12), preferably as continuous fibers embedded within meltable material in the form of filament. Therefore, at least one edge (12.1) of at least one layer (1) of the core structure (12) is covered by the continuous fibers embedded within meltable material. In the event several edges (12.1) are present, they may form a sideway of the core structure (12). In FIG. 3b edges (12.1) of the core structure (12) are shown with dotted line.

Figure 3C:
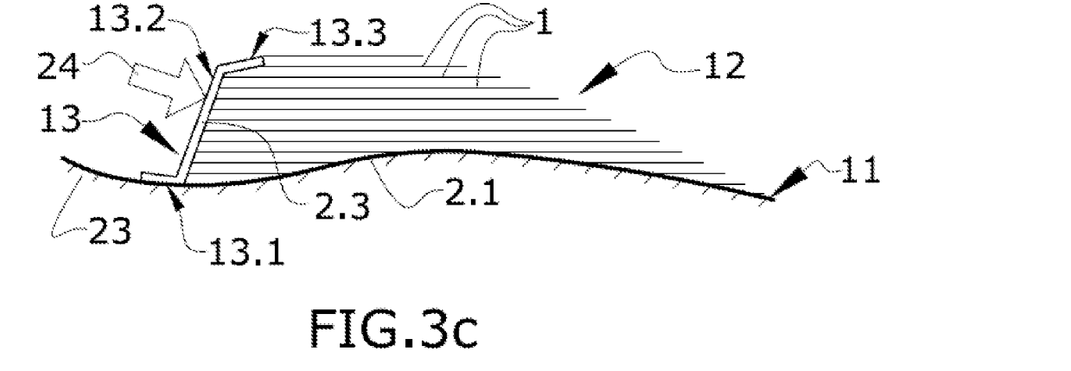
Figure 3D:
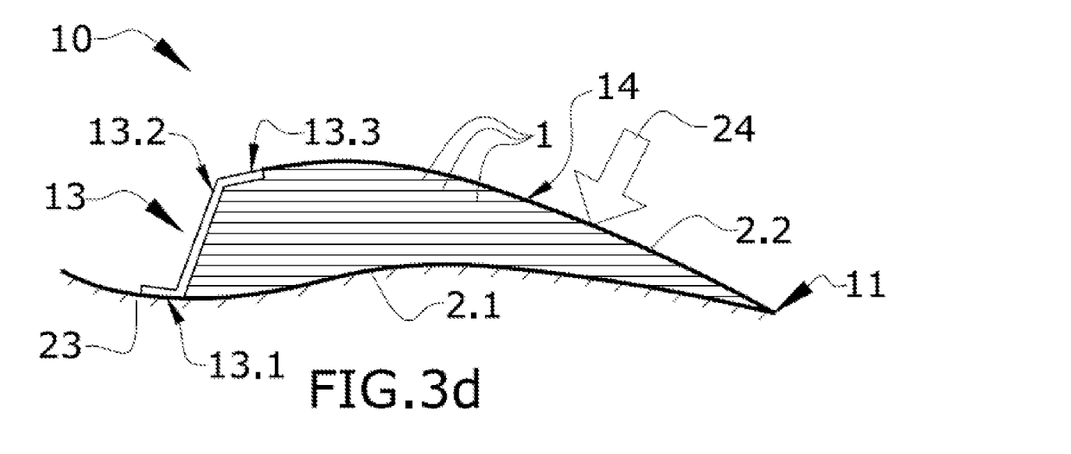

This process is performed as was described for steps a) and c) in connection with FIGS. 2a-2c. The head (24) moves on the three-translational axes (X, Y, Z) and/or rotations (around X, Y, Z), depositing a layer of fibrous material reinforcement embedded within meltable material (2.3) over both at least a portion of the lower aerodynamic face-sheet (11) and covering at least partially an edge (12.1) of at least one layer (1) of the core structure (12), thereby building an structural element (13). This step is schematically depicted in FIG. 3c. For illustrative reasons, only one layer of fibrous material reinforcement embedded within meltable material (2.3) is represented.

The nozzle (24) deposits each layer (2.3) with the material hardening prior to the application of the next layer (2.3) and the step is repeated until all the required layers (2.3) are deposited and the structural element (13) is completely built. Preferably, the structural element (13) built is a beam-shaped structural element.

Advantageously, the at least one structural element (13) covering at least one edge (12.1) of at least one layer of the core structure (12) offsets the staircase effect of the core structure (12).

The beam-shaped structural element (13) shown in FIG. 3c is a Z-shaped spar, which comprises:

a lower foot (13.1) built by the deposition of fibrous material reinforcement embedded within meltable material (2.3) onto at least a portion of the outer layer of the lower aerodynamic face-sheet (11);

a web (13.2) built by the deposition of fibrous material reinforcement embedded within meltable material (2.3) onto the edge (12.1) (or sideway) of at least one layer (or several layers) of the core structure (12); and an upper foot (13.3) built by the deposition of fibrous material reinforcement embedded within meltable material (2.3) onto a portion of the core structure (12), forming a continuous surface with the outer layer of the core structure (12), as can be seen in FIG. 3c.

The web (13.2) of the Z-shaped spar (13) may be either straight and angled with the upper (14) and lower (11) aerodynamic face-sheets corresponding to the staircase of the core structure (12), or may comprise a curvature radius in the joints between the lower foot (13.1) and the web (13.2), and/or the upper foot (13.3) and the web (13.2).

Curvature radius may be advisable to avoid the collision of the head (24) with some component of the aeronautical structure (10) when fibrous material reinforcement embedded within meltable material is being deposited.

Additionally, by placing continuous fibers embedded within meltable material (2.1, 2.2) to build the lower (11) and upper (14) aerodynamic surfaces of the aeronautical structure (10), an aeronautical structure (10) comprising soft curvatures can be produced, thus improving the aerodynamics thereof.

FIGS. 4a-4g show different integral composite aeronautical structures (10) corresponding with the manufacturing method of FIGS. 2a-2c (corresponding to FIG. 4a) or FIGS. 3a-3d (corresponding to FIG. 4b), which additionally comprise a non-homogeneous core structure (12).

Figure 4A:
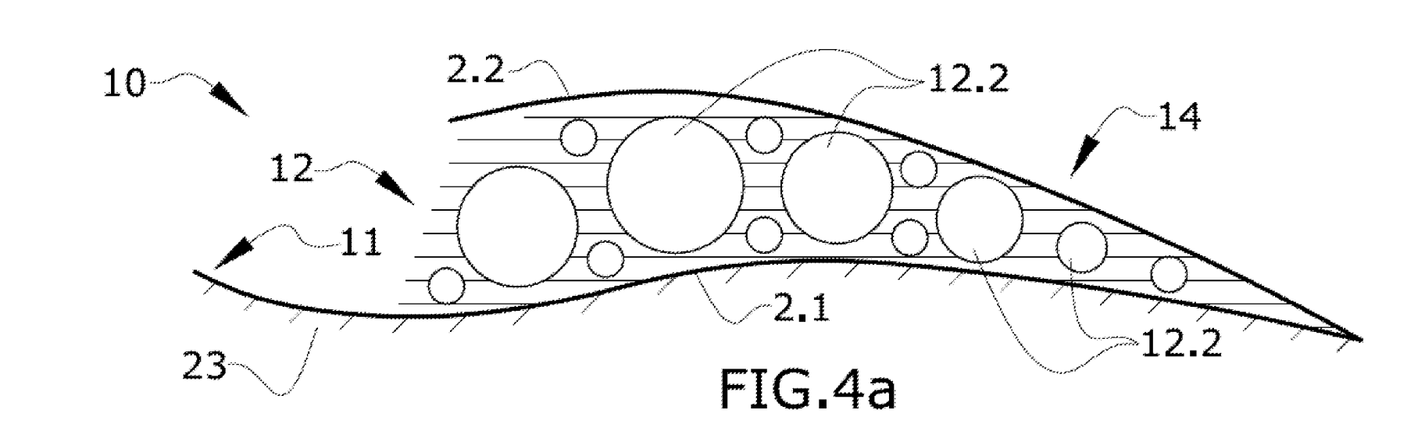
FIGS. 4a-4b show an integral composite aeronautical structure manufactured by either the method of FIGS. 2a-2c or FIGS. 3a-3d, which comprises a non-homogeneous core structure.
Figure 4B:
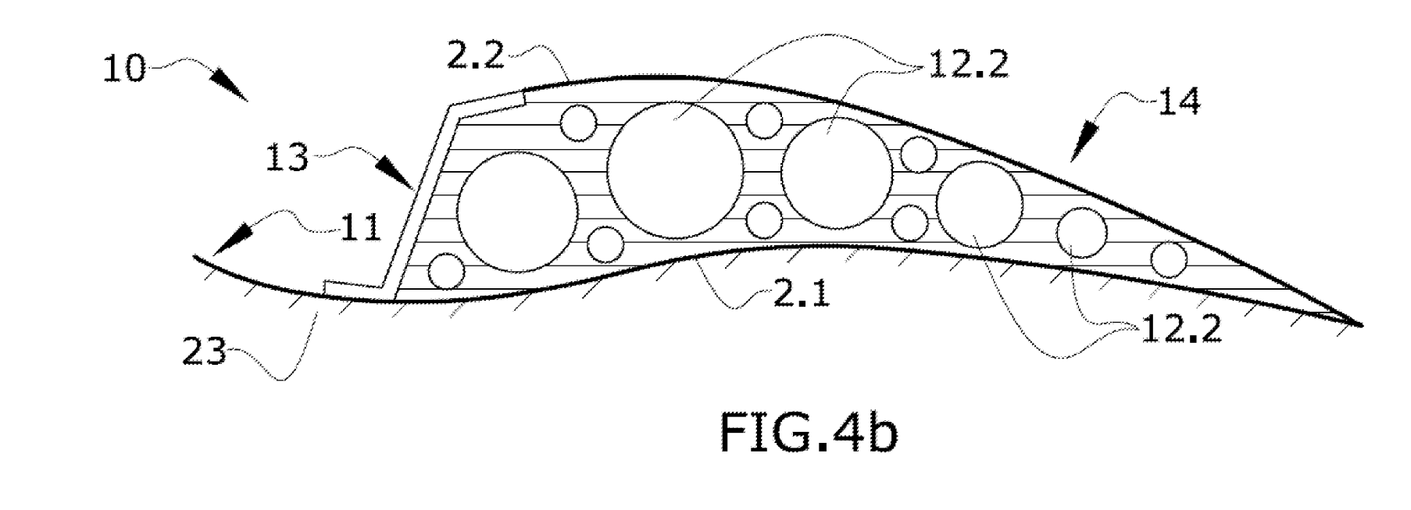

As can be seen in both FIGS. 4a and 4b, the core structure (12) is manufactured in these embodiments leaving hollowed spaces (12.2). Additional examples of this core structure (12) are shown in FIGS. 4c to 4g.

Figure 4C:
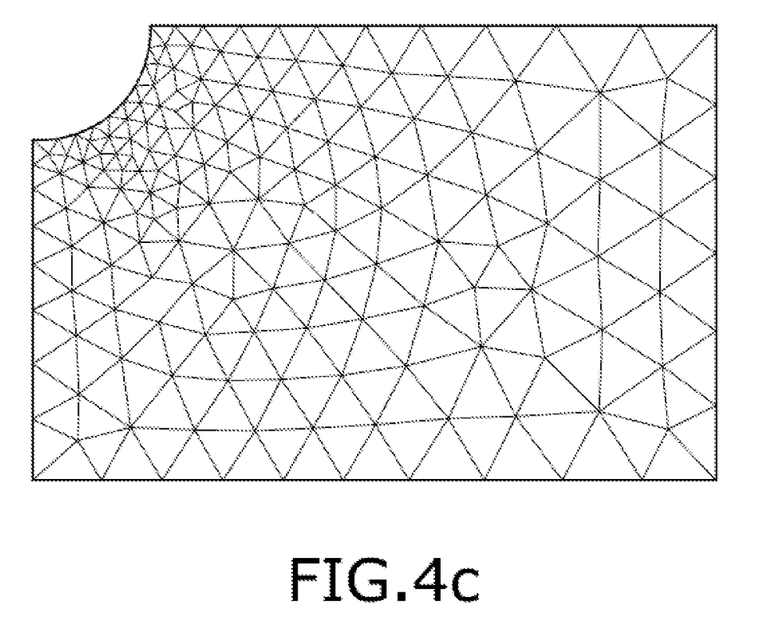
FIGS. 4c-4g show examples of non-homogeneous core structures.
Figure 4D:
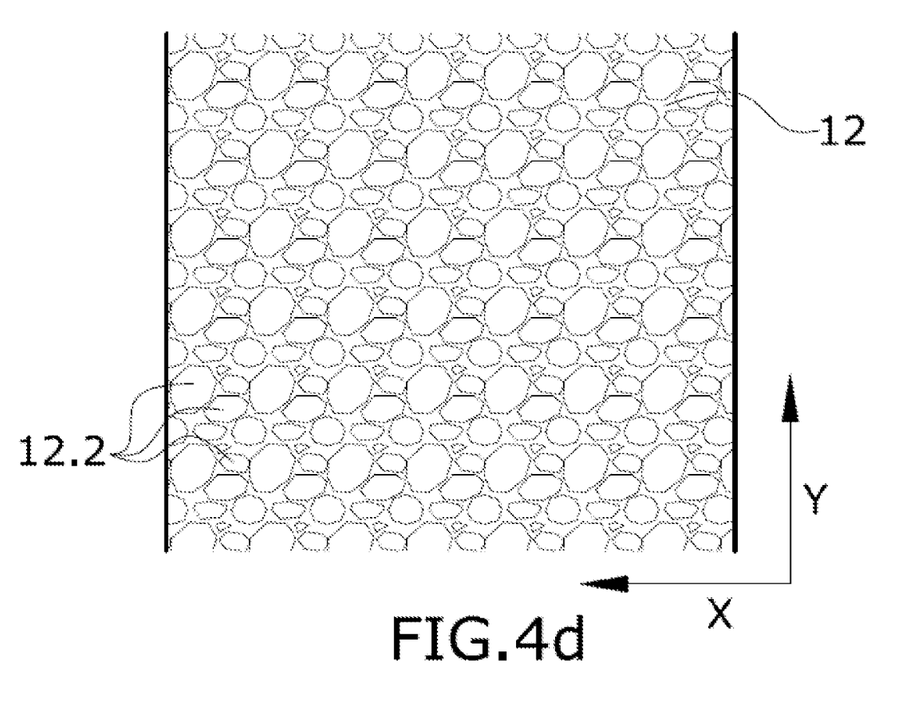
Figure 4E:
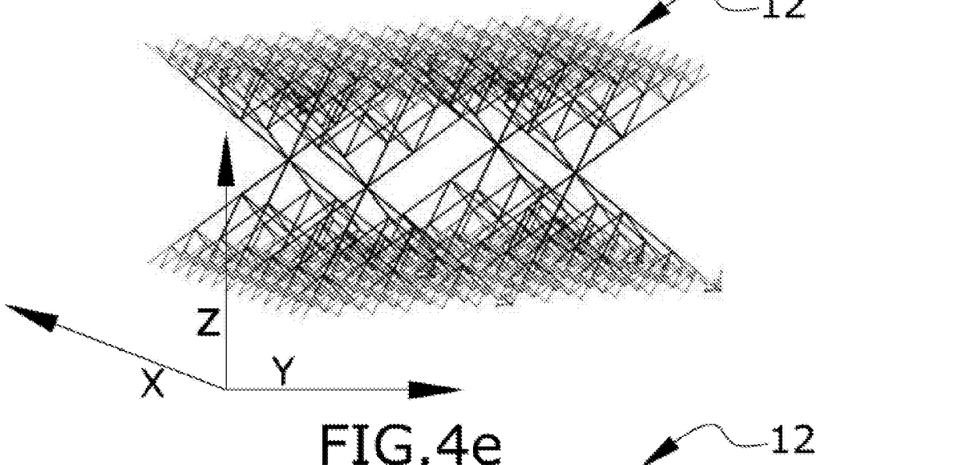
Figure 4F:
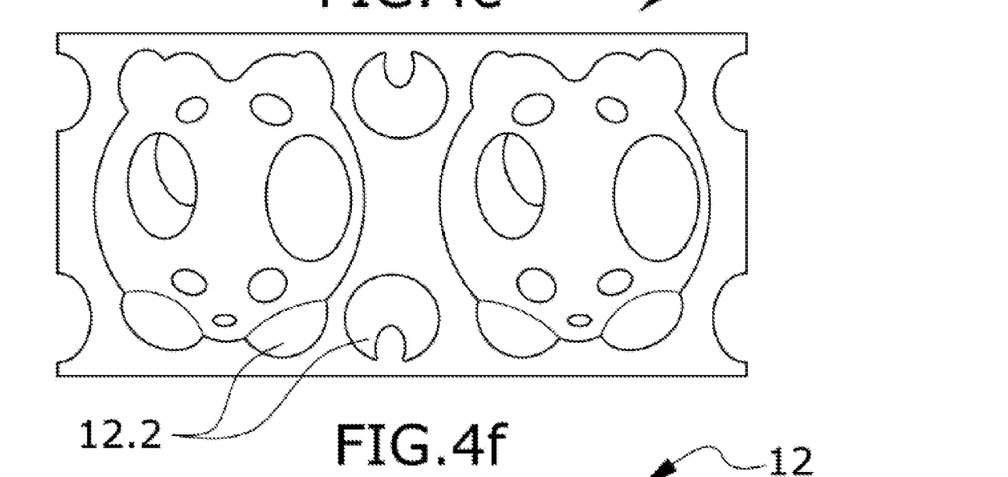
Figure 4G:
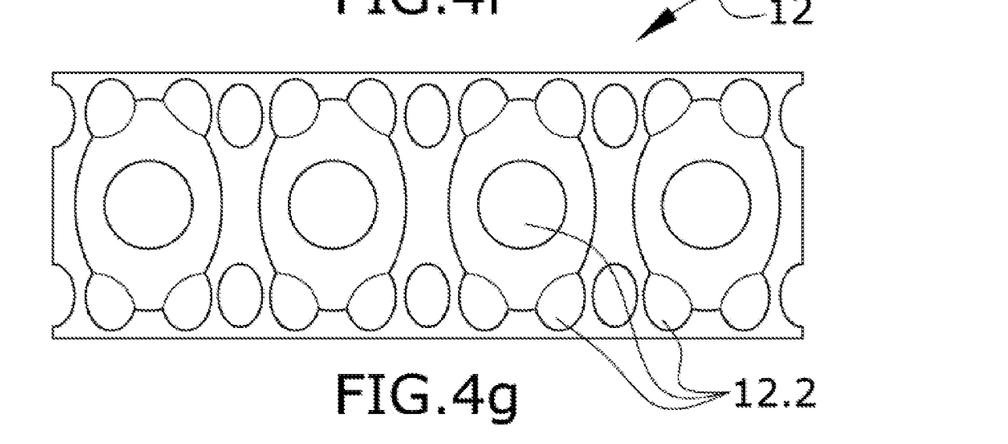

In FIG. 4c the core structure (12) comprises fractal type geometry. In FIG. 4d the core structure (12) comprises honeycomb geometry. In FIGS. 4e-4g the core structure (12) comprises a non-homogeneous core structure whose density varies. In particular, density increases as getting closer to the upper (14) and lower (11) aerodynamic face-sheets of the aeronautical structure (10).

Figure 5A:
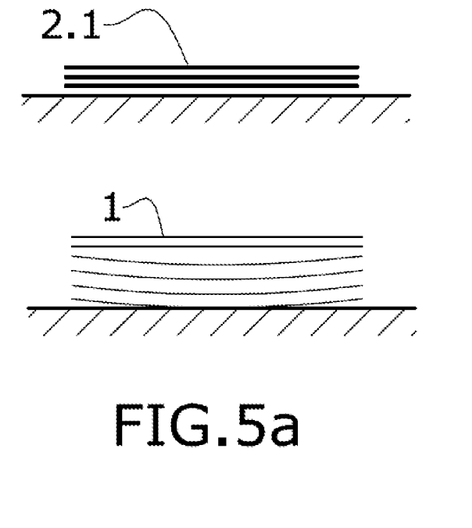
FIGS. 5a-5c shows different advantages obtained when depositing fibrous material reinforcement embedded within meltable material.
Figure 5B:
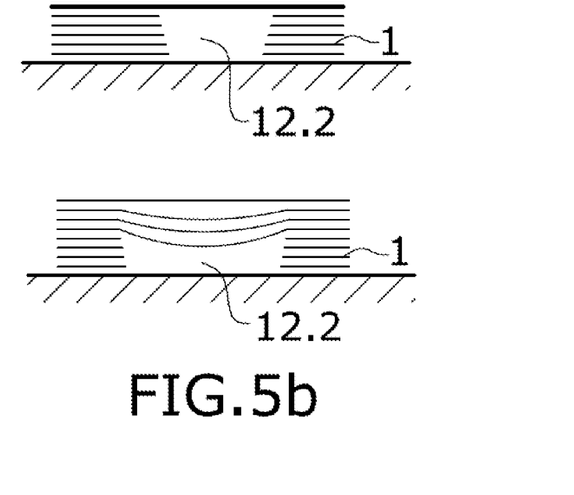
Figure 5C:
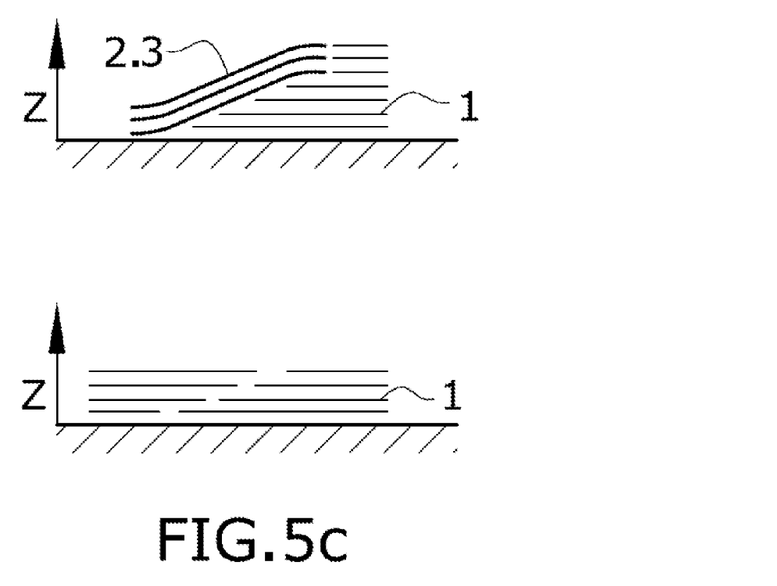

FIGS. 5a-5c show advantages of combining the deposition of meltable material solely, and fibrous material reinforcement embedded within meltable material.

Among others, the main advantages of such combination are as follows. For illustrative purposes in each figure, a contrast between the deposition of meltable material and the deposition of fibrous material reinforcement embedded within meltable material is shown, wherein in the lower part of the figures the deposition of only meltable material is shown and in the upper part of the figures the deposition of fibrous material reinforcement embedded within meltable material is shown:

FIG. 5a: Reduction of warp.

As Additive Manufacturing fabrication uses the physical effect of melting and hardening through temperature change, thermal expansion and shrinkage cause internal stresses in the components built. In the event large and flat structures are built by material deposition, this leads to a distortion in the component due to shrinkage of the layers (1). However, with the embedding of fibrous material reinforcement with a favorable thermal expansion coefficient, such as carbon fibers, the warp of the layers (2.1) of fibrous material reinforcement embedded within meltable material can be significantly reduced.

FIG. 5b: Bridging gaps.

In some cases, Additive Manufacturing fabrication may produce overhangs up to a certain angle without the need of a supporting structure. Nevertheless, completely flat overhangs without supporting structure are only possible with narrow gaps; otherwise, the strand of molten meltable material (1) may elongate downwards. However, by embedding fibrous material reinforcement (2.2), this elongation is reduced, so that larger gaps (12.2) may be bridged without a supporting structure.

This advantage is of special interest during the building of the core structure (12) with hollowed spaces (12.2) (as it was shown in FIG. 4), and therefore in the core structure (12) with a non-homogeneous core, or comprising a fractal type geometry, or comprising a honeycomb geometry.

FIG. 5c: Reduction of staircase effect and strengthen in Z-direction

As Additive Manufacturing fabrication deposition on two-horizontal axes (X, Y) produces a staircase effect due to the approximation of angles, by depositing additional layers in a non-planar fashion covering the edges an offsetting of the thresholds is achieved. Additionally, as the continuous fibers have the highest mechanical properties in its longitudinal axis and the layers of meltable material (1) are deposited horizontally, there are weak withstanding loads in Z-direction (substantially perpendicular to the depositing mold). However, by embedding fibrous material reinforcement deposited in layers (2.3), this load withstanding is increased, so that the mechanical properties of the component (10) built are improved in all directions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing layer-upon-layer an integral composite aeronautical structure, wherein the method comprises the steps of:

a) providing an additive manufacturing tool comprising a depositing mold shaping an aerodynamic surface and at least one head configured to be moved over the depositing mold and to deposit at least one of fibrous material reinforcement or meltable material;
b) depositing fibrous material reinforcement embedded within meltable material onto the depositing mold, at least one layer of a lower aerodynamic face-sheet being built thereby;
c) depositing meltable material onto at least a portion of the outer layer of said lower aerodynamic face-sheet, at least one layer of a core structure being built thereby; and
d) depositing fibrous material reinforcement embedded within meltable material onto at least an outer layer of said core structure, at least one layer of an upper aerodynamic face-sheet being built thereby;
wherein the steps b), c) and d) are performed using Additive Manufacturing technology, and,
wherein between steps c) and d) the method further comprises:
covering at least one edge of at least one layer of the core structure by depositing fibrous material reinforcement embedded within meltale material onto both at least a portion of the outer layer of said lower aerodynamic face-sheet and the core structure, at least one beam-shaped structural element being built therby,
wherein the beam-shaped structural element is a Z-shaped spar, and
wherein the deposition onto at least a portion of the outer layer of the lower aerodynamic face-sheet builds a loer foot of the Z-shaped spar, and
the deposition onto the edge of the at least one layer of the core structure builds a web of the Z-shaped spar.

2. The method according to claim 1, wherein in the step between steps c) and d) the fibrous material reinforcement is continuous fibers.

3. The method according to claim 1, wherein the fibrous material reinforcement deposited in step b) comprises continuous fibers.

4. The method according to claim 1, wherein the fibrous material reinforcement deposited in step d) comprises continuous fibers.

5. The method according to claim 1, wherein step c) comprises depositing fibrous material reinforcement embedded within meltable material, the fibrous material reinforcement preferably being short-fiber.

6. The method according to claim 1, wherein in step c) hollowed spaces free of material are formed during the depositing of either meltable material or fibrous material reinforcement embedded within meltable material, a non-homogeneous core structure with different densities being built thereby.

7. The method according to claim 6, wherein the density of the non-homogeneous core structure varies along at least one of a span length or cord length of the aeronautical structure.

8. The method according to claim wherein the deposition onto the core structure also builds an upper foot of the Z-shaped spar configured to form a continuous surface with the outer layer of the core structure.

9. The method according to claim 1, wherein the web of the Z-shaped spar is straight and angled with the upper and lower aerodynamic face-sheets, the angle corresponding to a staircase of the core structure.

10. The method according to claim 1, wherein joints between at least one of the lower foot and the web or the upper foot and the web, of the Z-shaped spar comprise a curvature radius.

11. The method according to claim 1, wherein the core structure comprises a fractal type geometry or a honeycomb geometry.

* * * * *